219-121 CROSS REFERENCE SEARCH ROOM

Dec. 2, 1969 F. F. WHITE, JR 3,482,218

READ-OUT METHOD FOR ELECTROSTATIC RECORDINGS

Filed July 27, 1964 2 Sheets-Sheet 1

INVENTOR
FREDERICK F. WHITE, JR.

BY John E. Griffiths
ATTORNEY

Dec. 2, 1969 F. F. WHITE, JR 3,482,218

READ-OUT METHOD FOR ELECTROSTATIC RECORDINGS

Filed July 27, 1964 2 Sheets-Sheet 2

INVENTOR
FREDERICK F. WHITE, JR.

BY John E. Griffiths
ATTORNEY

United States Patent Office 3,482,218
Patented Dec. 2, 1969

3,482,218
READ-OUT METHOD FOR ELECTROSTATIC RECORDINGS

Frederick F. White, Jr., Wilmington, Del., assignor to E. I. du Pont de Nemours and Company, Wilmington, Del., a corporation of Delaware Filed July 27, 1964, Ser. No. 385,409
Int. Cl. G11b 5/30; G01d 15/06
U.S. Cl. 340—173 9 Claims

ABSTRACT OF THE DISCLOSURE

A method, and apparatus, of read-out of electrostatic charges where the record medium is external of a scanning tube and is separated from a scanning beam by a dielectric-medium.

This invention relates to two-dimensional read-out systems for read-out of electrostatic charges recorded on dielectric record media such as dielectric tapes.

Various methods are known for recording video signals electrostatically as internal field patterns within a record medium. A typical method is described for example in Camras U.S. Patent No. 3,040,124 issued June 19, 1962.

Methods are also known for reproducing such recorded patterns and converting them into a corresponding electrical signal for conversion in turn into a viewable two-dimensional image.

One such reproduction method is disclosed in the aforementioned Camras patent. Camras utilizes as a playback head a tube having a series of electrically conductive wires as electrodes extending through the end face of the tube. In read-out operation the wires contact the surface of the record medium with resulting scratching partial erasure and generally less than satisfactory fidelity in reproduction. In addition, the inherent capacitance between individual wire electrodes and the record medium, and also between closely spaced adjacent wires make it difficult for the read-out device to sense very small charge differences in the record medium, thus resulting in poor resolution. Furthermore, misalignment which frequently occurs between the read-out wires and the maxima of charges placed in the record medium by corresponding recording wires or pins reduces the signal output and results in an undesirably low signal-to-noise ratio. The construction of a tube with a plurality of closely-spaced, precisely-positioned wires or pins is extremely difficult and costly.

Another reproduction system is described in the Journal of the Society of Motion Picture Engineers, Vol. 69, pages 32–35, January 1960. This system was developed by RCA and accomplishes read-out of an electrostatic charge pattern on a composite photo-conductive type by means of a scanning electron beam. The electron beam impinges on the record medium during read-out. As stated in the RCA article and as is readily observable by one atempting to use this RCA method of read-out, the RCA method is partially destructive and has the disadvantage of causing at least partial erasure of the charge pattern with reuslting loss of fidelity in successive repetitive read-out operations. A recognizable picture can be produced by the RCA method for only about two or three read-outs.

The present invention provides a novel method and several devices for read-out of recorded electrostatic charges which overcome the disadvantages of the prior art referred to above.

The present invention in its simplest terms uses the signal output from the interaction of an electron beam such as from an electron gun of a cathode-ray tube and the electric fields of charges in a record medium which charges affect the electrons leaving the fields so that these electrons collected by means adapted to receive them produce a signal corresponding to the image in the record medium. This is accomplished without direct impingement of an electron beam upon the record medium.

In the present invention, therefore, read-out of electrostatically recorded intelligence in a record medium is effected by directing a beam of electrons such as emitted by an electron gun of a cathode-ray tube continuously towards the record medium and into the zone of influence of the electric fields of charges in the record medium; while preventing the electron beam from impinging upon the record medium by means which causes electrons to leave said zone, these latter electrons having been influenced by said electric fields and therefore corresponding to the said recorded intelligence and capable of collection by an electron collector which produces a signal corresponding to the intelligence in the record medium. In practice the beam of electrons entering the zone of influence of the recorded charges will be controlled to cyclically scan the electric fields.

In one important first embodiment (see FIGURE 2) the present invention comprises directing a beam of electrons continuously and with cyclical scanning towards and upon a thin dielectric taget so positioned such that the target is within, i.e., in inductive relationship to, the electric field of charges in a tape bearing electrostatically recorded information and moving past and adjacent the target, the target being adapted to emit secondary electrons upon being impinged with primary electrons, and collecting the secondary electrons to produce a signal corresponding to the electrostatically recorded information in the tape.

Specifically, in this first embodiment, the reproducing system comprises a cathode-ray tube having an electron gun adapted to direct continuously a beam of primary electrons toward and against a thin dielectric target, the target adapted to emit secondary electrons upon being impinged with primary electrons, means to cause the beam to cyclically scan the target, means to pass an electrostatic record medium adjacent the target in a manner to affect the emission of secondary electrons from the target, and collector means adapted to receive the secondary electrons and to produce a signal corresponding to the image on the electrostatic record.

In a second important embodiment (see FIGURE 3) the present invention comprises directing a beam of electrons continuously and with cyclical scanning towards a thin dielectric target so positioned that the target is within the electric field of charges in a tape bearing electrostatically recorded information and moving past and adjacent the target as in the first embodiment described above. However, as the electron beam in this second embodiment enters the electric field and approaches the target, the beam is decelerated and deflected to an electron collector which produces a signal corresponding to the electrostatically recorded information in the tape.

Specifically, in this second embodiment, the reproducing system comprises a cathode-ray tube having an electron gun adapted to direct continuously a beam of electron toward a thin dielectric target, means to cause the beam to cyclically scan the target, means to pass a electrostatic record adjacent the target in a manner to effect variations in the electron beam in accordance with variations in the electrostatic record, means for deflecting the electron beam after the variations have been effected in it away from the target, and collector means adapted to receive the deflected electrons and to produce a signal corresponding to the image on the electrostatic record.

The invention will be more fully understood by reference to the attached drawing wherein FIGURE 1 is a diagrammatic representation of a dielectric record medium having transversely recorded electrostatic patterns;

Figure 1:
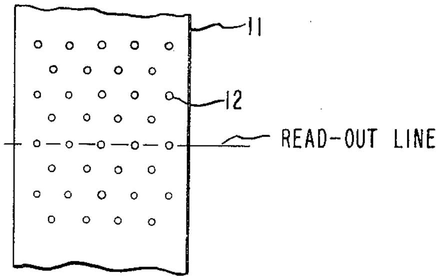

Referring to the drawing, dielectric record medium or recording tape 11 as illustrated has a transverse array of electrostatic charges 12 disposed longitudinally along the tape. During read-out the tape 11 is moved continuously around backing guide 13 so as to pass in front of the selected read-out tube.

Figure 2:
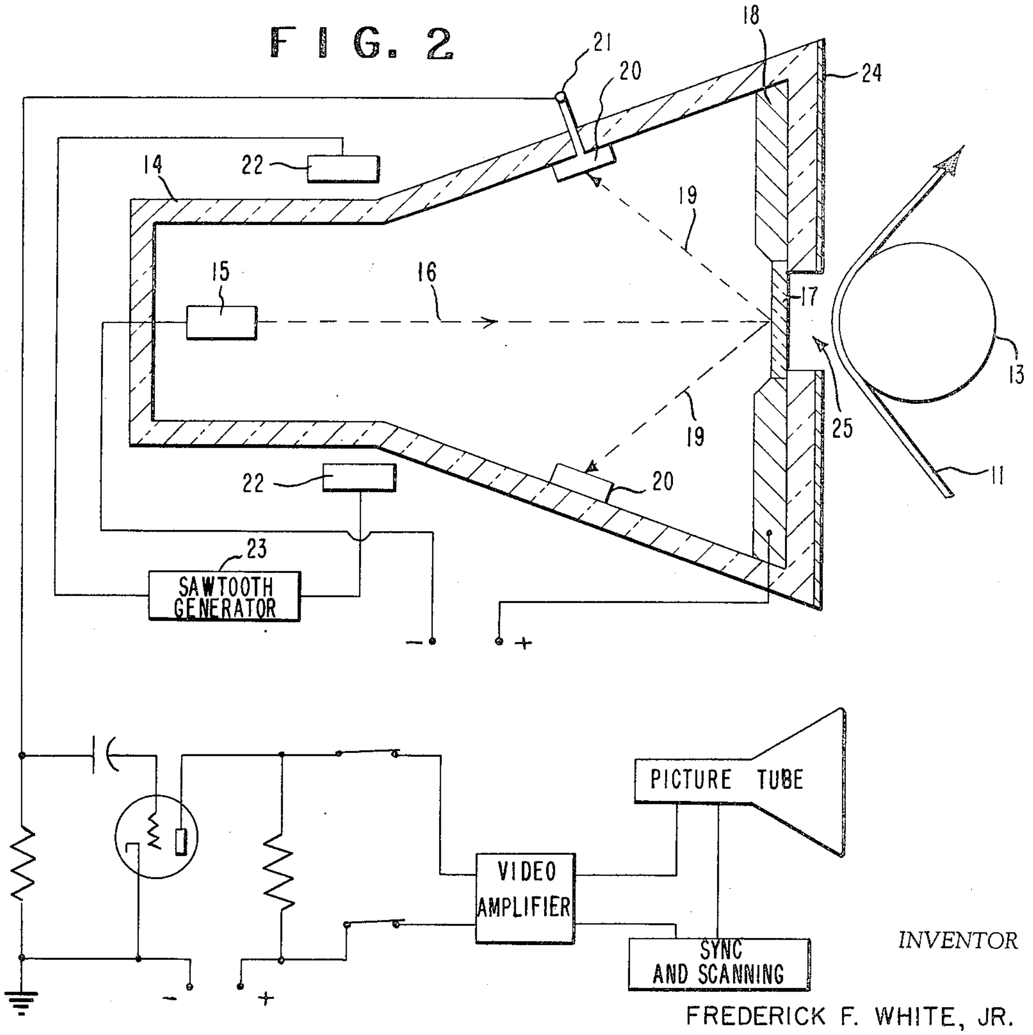
FIGURE 2 is a diagrammatic representation of one embodiment of a reproducing system according to this invention.

The embodiment of the transducer shown in FIGURE 2 includes an evacuated cathode-ray tube 14 having an electron gun 15 for producing an electron beam 16 directed towards dielectric target 17 in face plate 18, to cause emission from the target 17 of secondary electrons 19 which in turn are collected by annular collector ring 20 to provide an output current at electrode 21. The tube 14 is provided with a deflection coil or yoke 22 connected to a sawtooth wave generator 23 to cause in known fashion the electron beam 16 to scan horizontally across the face of the tube in a direction transverse to the direction of movement of tape 11. The synchonization of the scan of beam 16 with recorded lines of information 12 in the tape 11 can be readily controlled by appropriate pulses recorded in the tape along with the video information. Optionally, face plate 18 may be provided with an external grounded conductive surface 24 having a narrow slit 25 opposite the line scanned by electron beam 16 to achieve improved resolution.

Figure 3:
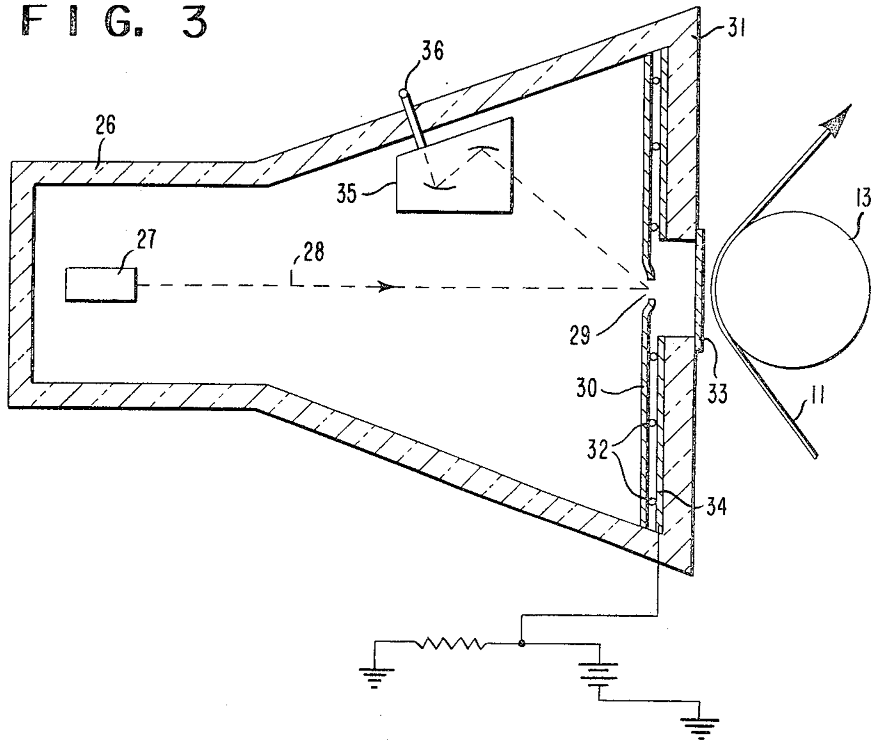
FIGURE 3 is a diagrammatic representation of a second embodiment of a reproducing system according to this invention.

Operational circuitry suitable for use of the embodiments of each of FIGURES 2 and 3 is detailed schematically in FIGURE 2. As shown, standard means are provided for energy input and cyclical scanning. The output circuit utilizing the signal from electrode 20 is also quite conventional and employs standard components as indicated for reconstruction of an image on a cathode-ray picture tube.

The embodiment of the transducer shown in FIGURE 3 includes an evacuated cathode-ray tube 26 having an electron gun 27 for producing an electron beam 28 directed towards an elongated slit or opening 29 in deceleration electrode 30 which is in spaced relation to the end wall 31 of tube 26. The spacing can be effected by any suitable insulating means such as glass beads 32. Horizontal scanning is effected conveniently as shown in FIGURE 2.

Positioned in the opening of wall 31 is dielectric target 33. The inner surface of end wall 31 is coated with a conductive material 34 which is connected to the exterior of tube 26 where it may be grounded or maintained at a potential adjustable for optimum operation. As in the embodiment of FIGURE 2, the tube face plate may optionally be provided with an external grounded conductive surface (for simplicity, not illustrated in FIGURE 3) having a narrow slit opposite the line scanned by electron beam 28 to achieve improved resolution.

The interior of tube 26 is provided with an electron multiplier collector 35 which is shown for simplicity as being positioned on one side of electron gun 27 whereas collector 35 will usually be an annular structure encircling the electron gun and comprising a plurality of plates or dynodes, each in sequence at a progressively higher positive potential for increasing the output current by secondary emission from each plate until a useful output current is obtained at electrode 36.

The output signal obtained from the practice of the present invention, e.g., the output at electrodes 21 or 36, is of course an electrical signal varying in both amplitude and frequency. The signal can be used directly as illustrated in the drawing for display on a cathode-ray image tube or, if desired, can be used for video transmission or for modulation of a radio frequency carrier. Audio signals can of course be reproduced concurrently and with synchronization in accordance with known techniques.

In the operation of each of the herein illustrated embodiments of this invention, it will be understood that an incident electron beam of more or less constant current characteristics for a particular operation will ordinarily be used. The beam is then subjected or exposed directly to a dielectric target or merely to the influence of a dielectric target having a measurable potential. As the tape 11 travels past target 17 or target 33, the electric field of the charges in the tape will momentarily alter the potential on the respective target in accordance with the recorded information in the tape.

By way of explanation, in the embodiment of FIGURE 2 the alteration just referred to will directly affect and alter the number of secondary electrons emitted from target 17 and therefore directly affect and alter the number of electrons received by collector 20, thus directly causing changes in the output signal from electrode 21. In the embodiment of FIGURE 3 the alteration of the potential of target 33 will affect and alter the number of electrons extracted by target 33 from beam 28 and therefore directly affect and alter the number of electrons received by collector 35, thus directly causing changes in the output signal from electrode 36. The basic difference in the two embodiments lies in the fact that the embodiment of FIGURE 2 uses an incident electron beam and notes variations in a return beam of secondarily emitted electrons whereas in the embodiment of FIGURE 3 the return beam is a reflected or deflected continuation of the incident beam. In each case, however, the return beam conveys to the respective collector variation caused by and corresponding to image variations in the electrostatic record medium.

Standard materials of construction can be used for the apparatus of this invention. The tubes will ordinarily be of glass and the electrodes of suitably conductive metals. Suitable electron guns, collectors, multipliers, and the like, are commercially available.

The targets can be of any thin dielectric material of high resistivity and low surface conductivity. Suitable materials include glass and mica. Preferred targets are made of mica in the range of about 0.0005 to 0.002 and preferably about 0.001 inch thick.

As will be understood from the above, the read-out signal will vary as variations occur in the ratio of return beam electrons to incident beam electrons as a function of the voltage of the incident beam. This relationship is illustrated in FIGURE 4 for the embodiment of FIGURE 2 wherein the ratio of the number of secondary or return beam electrons to the number of primary or incident beam electrons is plotted as a function of the voltage of the primary or incident beam for 0.001 inch mica, a typical dielectrical target material.

Figure 4:
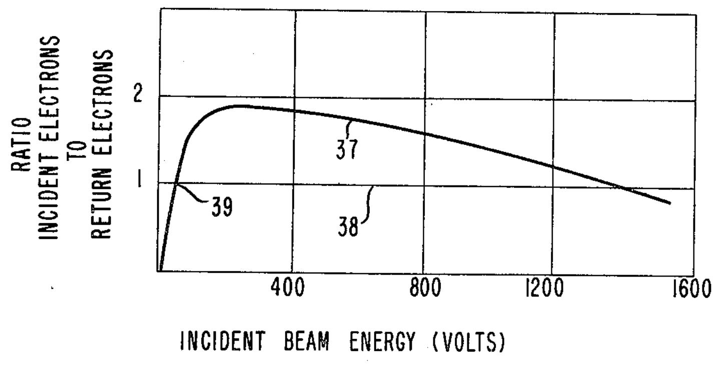
FIGURE 4 is a curve illustrating the relationship between the ratio of secondary to primary electrons and the voltage of the primary electron beam for the embodiment of FIGURE 2.

Referring to FIGURE 4 it will be seen that the ratio just mentioned, plotted as curve 37, rises sharply as voltages increase at lower voltages. The ratio curve crosses the unity line 38 (where the number of primary or incident electrons is equal to the number of secondary or return electrons) at 39, corresponding to an incident beam energy in the range of about 30 to 50 volts. After passing through a maximum, the curve falls slowly until it again intersects unity line 38 in the range of about 1300 to 1500 volts. Although, as will be apparent, conditions could be set and controlled so as to operate over the entire range or even up to as high as 1600 to 1800 volts and higher, in a preferred aspect, it has been found that surprisingly outstanding linearity and resolution are obtainable when operating in the higher voltage range where the ratio curve and the unity line intersect. As will be appreciated, the precise voltage will be different depending upon the target material, target thickness, etc, but ordinarily the preferred operation will utilize a constant-current primary beam and a voltage in the 1300 to 1500 range, at a ratio of 1 plus or minus 5% and most preferably as close to unity as possible.

Operations at values below unity where an excess of electrons would tend to accumulate on the target resulting in a net negative charge on the target, or conversely operations at values below unity where a net positive charge would tend to accumulate, can be carried out but requires greater controls and less satisfactory resolution and linearity due to possible gradual drift in effective beam potential.

In a modification of the present invention, instead of the target being substantially in line form, the target could be an area scanned by a beam having both horizontal and vertical deflection effected by known means. This modification would be particularly useful for read-out of electrostatic images in media fixed with respect to the modified transducer.

The present invention has the advantage that the necessity is avoided for mechanical scanning of record media as is required in some non-electrostatic recording systems. Also, the present invention does not require the awkward and tedious dusting with electroscopic powders used in read-out of some electrostatic recording systems. Furthermore, the present invention achieves excellent resolution, linearity and repetitive fidelity while being non-destructive of the record image. Operation is relatively simple and the equipment is inexpensive and easy to construct.

The foregoing detailed description has been given for clarity of understanding only and no unnecessary limitation is to be applied therefrom. As will be readily apparent to persons skilled in the art, a large number of varied and different modifications of the present invention can be visualized without departing from the scope or spirit thereof.

The invention claimed is:

1. The read-out method for converting electrostatic recorded intelligence in a record medium to a corresponding electrical signal comprising passing electrostatic recorded intelligence along a first major surface of a material consisting essentially of a dielectric medium having two major opposed surfaces and close enough thereto for electric fields of charges of said electrostatic recorded intelligence to create a zone of electrical influence including the second major surface of said dielectric medium, directing a primary beam of electrons continuously and with cyclical scanning, into said zone of electrical influence of said electric fields of said charges of said electrostatic recorded intelligence, toward but not through said dielectric medium at its second major surface, thereafter withdrawing continuously a return beam from said zone and surface, said return beam having been influenced by said electric fields of charges and therefore variations in said return beam corresponding to variation in said electrostatic recorded intelligence, and collecting the electrons in said return beam and creating a variable electrical signal corresponding to variations in said return beam.

2. The read-out method for converting electrostatic recorded intelligence in a record medium to a corresponding electrical signal comprising passing electrostatic recorded intelligence along a first major surface of a material consisting essentially of dielectric medium capable of emitting secondary electrons and having two major opposed surfaces and close enough thereto for electric fields of charges of said electrostatic recorded intelligence to create a zone of electrical influence including said secondary electrons and the second major surface of the dielectric medium, directing a primary beam of electrons continuously and with cyclical scanning, into said zone of eletrical influence of said electric fields of said charges of said electrostatic recorded intelligence into contact with said dielectric medium and its secondary electrons and at its second major surface, thereafter withdrawing and collecting the secondarily emitted electrons from said medium and creating an electrical signal corresponding to the collected emitted electrons.

3. The read-out method for converting electrostatic recorded intelligence in a record medium to a corresponding electrical signal comprising passing electrostatic recorded intelligence along a first major surface of a material consisting essentially of a dielectric medium having two major opposed surfaces and close enough thereto for electric fields of charges of said electrostatic recorded intelligence to create a zone of electrical influence including the second major surface of said dielectric, directing a primary beam of electrons continuously and with cyclical scanning, into said zone of electrical influence of said electric fields of said charges of said electrostatic recorded intelligence near the second major surface of said dielectric medium, deflecting said beam away from said medium to avoid contact therewith and to form a return beam, said return beam having been influenced by said medium corresponding to variation in said electrostatic recorded intelligence, and collecting the electrons in said return beam and creating an electrical signal corresponding to electrons in said return beam.

4. The method as set forth in claim 2 wherein said medium is mica.

5. The method as set forth in claim 2 wherein said primary beam is a constant-current beam having a potential in the range from 1300 to 1500 volts.

6. The method as set forth in claim 5 wherein the ratio of the number of said collected electrons to the number of electrons in said primary beam is approximately 1.

7. The method as set forth in claim 3 wherein said medium is mica.

8. The method as set forth in claim 3 wherein said primary beam is a constant-current beam having a potential in the range from 1300 to 1500 volts.

9. The method as set forth in claim 8 wherein the ratio of the number of said collected electrons to the number of electrons in said primary beam is approximately 1.

References Cited

UNITED STATES PATENTS

| | | | |
|---|---|---|---|
| 2,822,493 | 2/1958 | Harsh | 340—173 |
| 3,124,790 | 3/1964 | Kuehler | 346—74. |
| 3,181,125 | 4/1965 | Vadopalas | 340—173 |
| 3,308,444 | 3/1967 | Ting | 340—173 |

TERRELL W. FEARS, Primary Examiner

U.S. Cl. X.R.

219—121; 315—8.5; 346—74